Oct. 22, 1963
H. J. LOVEGROVE
3,107,948
MAGNETIC SUSPENSION BEARING
Filed Jan. 7, 1960
2 Sheets-Sheet 2
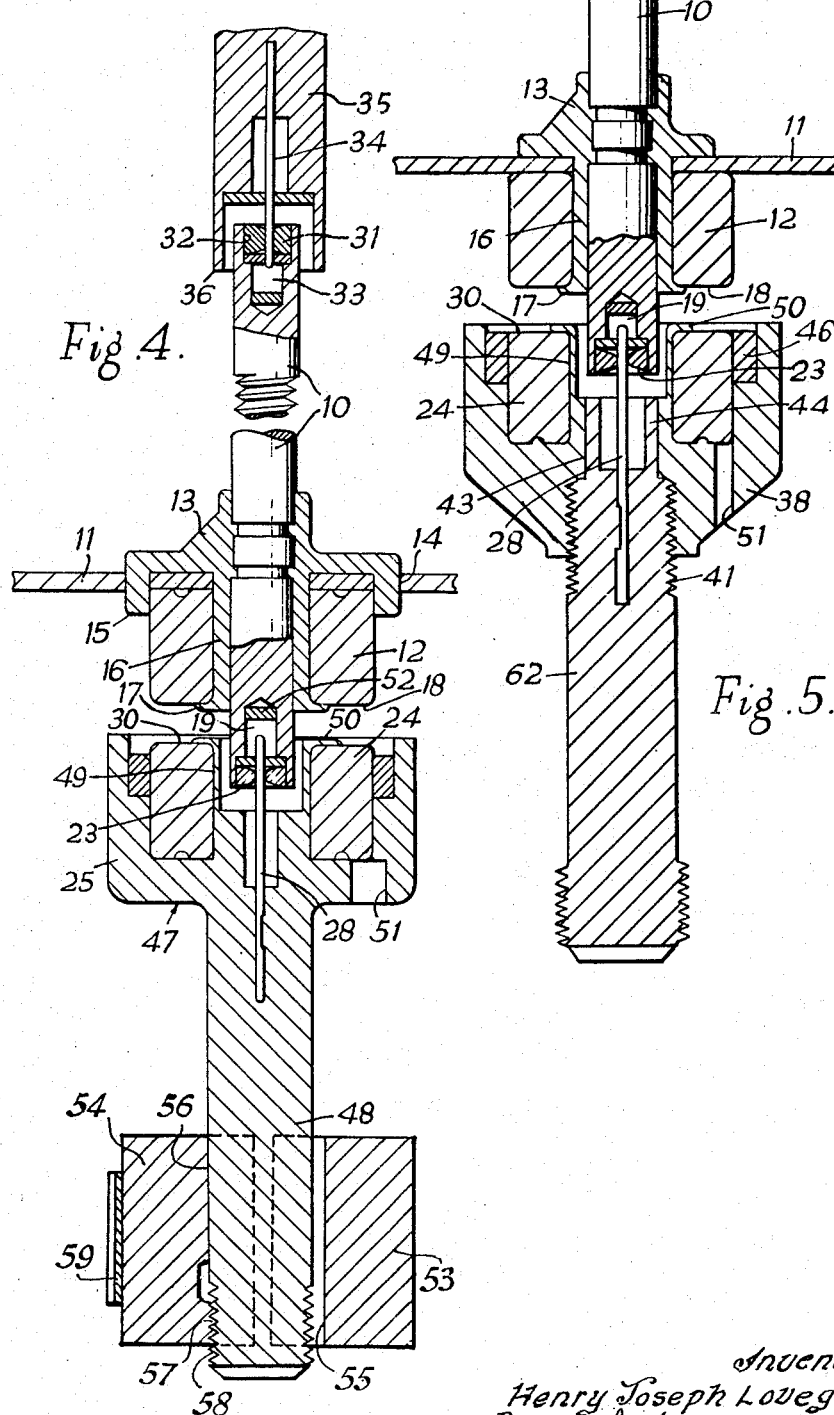
Inventor:
Henry Joseph Lovegrove
By
Attys.

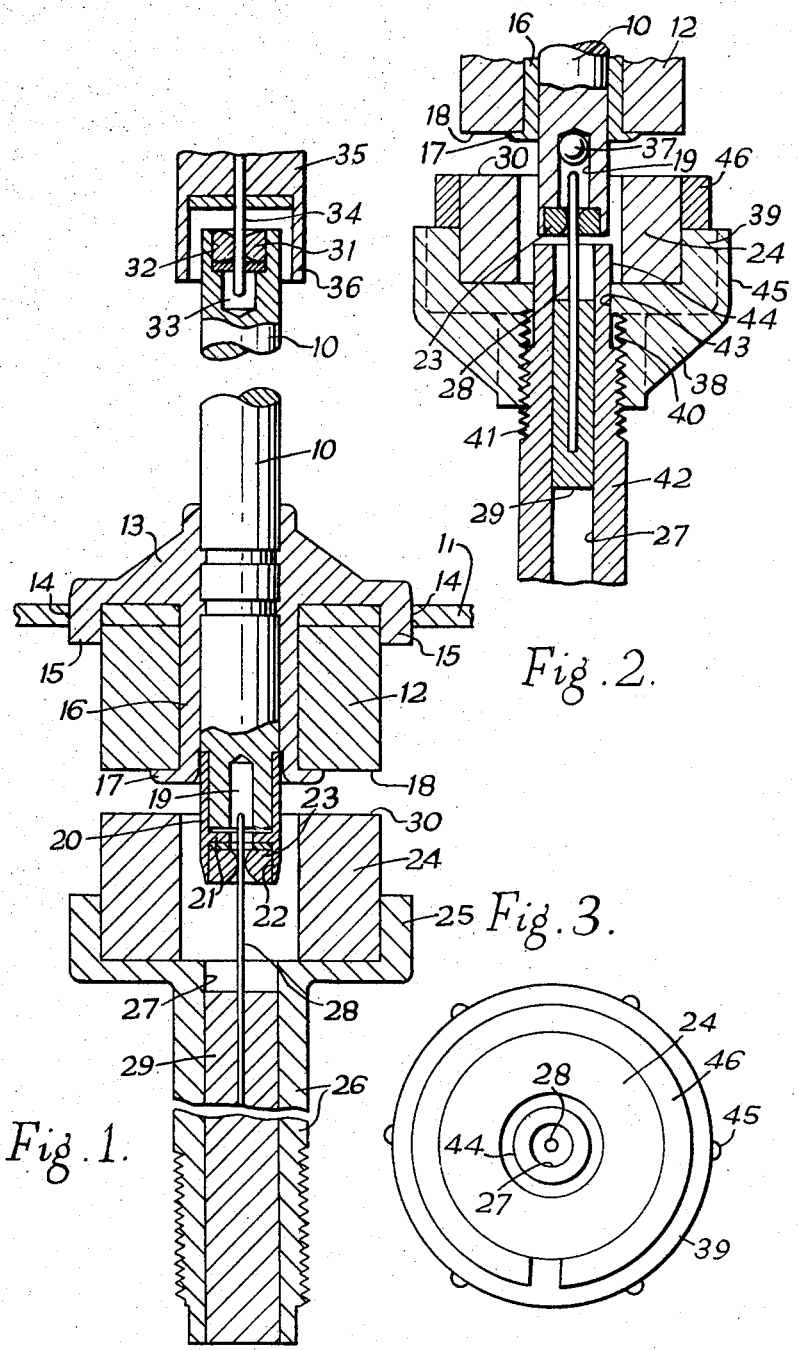

United States Patent Office 3,107,948
Patented Oct. 22, 1963

3,107,948
MAGNETIC SUSPENSION BEARING
Henry Joseph Lovegrove, Barnet, England, assignor to Sangamo Electric Company, Springfield, Ill., a corporation of Delaware
Filed Jan. 7, 1960, Ser. No. 1,104
Claims priority, application Great Britain Jan. 21, 1959
7 Claims. (Cl. 308—10)

This invention relates to bearing constructions for supporting spindles or the like which are rotatable about an axis which is vertical or substantially so and is more particularly concerned with arrangements of the type employing magnetic repulsion as a means for supporting the weight of the spindle or like member and any other parts carried thereby. The invention has particular, although by no means exclusive, application to the magnetic suspension of the spindle of an electric watthour meter.

In accordance with the present invention a magnetic suspension bearing for a spindle, such as the spindle of an electric watthour meter, comprises a first cylindrical and tubular permanent magnet secured to said spindle in co-axial relationship therewith and with its lower annular end surface disposed in a plane normal to the axis of spindle rotation and a second similar cylindrical and tubular permanent magnet secured below said first permanent magnet in a fixed position co-axial with said axis of spindle rotation and with its uppper annular end surface parallel with but spaced from said lower end surface of said first magnet, said magnets each being magnetised with an axial polarisation direction and having the faces thereof which oppose one another of like polarity, and further bearing means at or adjacent the respective upper and lower ends of said spindle, said further bearing means being each of a type which permits axial displacement movement but inhibits lateral displacement movement of the spindle with respect thereto.

In order that the nature of the invention may be more readily understood a number of different constructional embodiments will now be described in some detail with reference to the accompanying drawings wherein like parts have been given similar reference numerals and in which:

FIG. 1 is a vertical cross-section through the upper and lower end bearing arrangements of an electric watthour meter spindle constructed in accordance with the invention.

FIG. 2 is a fragmentary view of the lower bearing arrangements in a modified form of construction in accordance with the invention.

FIG. 3 is a plan view of part of the arrangement shown in FIG. 2.

FIG. 4 is a vertical cross-sectional view, similar to FIG. 1, of another form of construction in accordance with the invention while FIG. 5 is a vertical cross-sectional view of a lower bearing arrangement forming yet a further embodiment of the invention.

Referring first to FIG. 1 of the drawings, reference numeral 10 indicates the normal rotor spindle e.g. of aluminium, of an alternating current watthour meter to which is secured the usual rotor disc 11, also of aluminium, at a point near to the lower end of the spindle. A short cylindrical tubular permanent magnet 12 is also secured to the spindle 10 beneath the rotor disc 11 in a position where it lies co-axial with the spindle axis. The three parts, that is to say, the spindle 10, the rotor disc 11 and the magnet 12 are preferably rigidly secured together as shown by a single die-cast body 13 of light metal alloy. With this particular securing arrangement, holes 14 are provided in the rotor disc 11 at appropriate angularly displaced positions around the centre hole of the disc, which hole is rather larger in diameter than the spindle 10, in order to permit flow of the die casting metal through the disc whereby the die cast body forms an integral securing ring 15 around the upper top edge surface of the magnet and below the under surface of the disc 11 and a central tubular extension 16 of the dies cast body which extends downwardly through the central hole and between the bore of the magnet 12 and the spindle 10 and terminates at its lower end as an outwardly directed flange 17 disposed beneath the lower annular shaped end face 18 of the magnet.

At its lowermost end the spindle 10 is bored axially to form an upwardly extending recess 19. The lower end of the spindle is also reduced in diameter externally to receive a tubular metal cap 20 having an internal annular wall 21 to define a jewel socket 22 within which is retained a ring type bearing jewel 23.

A second short cylindrical tubular permanent magnet 24, similar to the permanent magnet 12, is secured within an enlarged cup-shaped upper end 25 of a screw threaded central tubular extension 16 of the die cast body which is held in a stationary mounting member (not shown), forming part of the meter frame. The securing arrangement is such that the vertical position of the sleeve 26 may be accurately adjusted in its height such as by the use of the screw threaded lower portion of the sleeve. The magnet 24 is rigidly secured within the cup 25, for instance, by spinning the edge of the cup firmly thereonto or by means of an adhesive.

Within the bore 27 of the sleeve 26 is rigidly secured the lower end of a pintle 28 made of hardened steel or cobenium. This pintle is secured in a position coaxial with the axis of the magnet 24 and of the sleeve 26 in any convenient manner, for instance and as shown, by casting within a body 29 of type metal which fills the majority of the bore 27 of the sleeve 26. The upper part of the pintle 28 passes through the bearing aperture of the ring jewel 23 and its uppermost end is smoothly rounded and is located within the recess 19 of the spindle 10.

The permanent magnets 12 and 24 are magnetised with an axial direction of polarisation and are arranged so that the annular shaped downwardly facing undersurface 18 of the magnet 12, which surface lies in a plane normal to the axis of rotation of the spindle 10, and the corresponding opposing annular shaped upper end surface 30 of the magnet 24 which lies parallel with the surface 18, are of like polarity. The resulting repulsion between the opposing magnet poles serves to support the weight of the rotor system comprising the spindle 10, the rotor disc 11 and the upper magnet 12 with the securing die cast body 13.

The uppermost end of the spindle 10 is provided with a pintle and ring jewel type bearing broadly similar to that at the lower end of the spindle and comprising a ring jewel 31 secured within a downwardly directed axial bore 32 in the upper end of the spindle 10, such bore being provided with a reduced diameter extension recess into which the lower end of the upper pintle 34, which is fixed within an upper bearing support member 35, may project. For the purpose of shrouding the upper bearing, the lower end of the bearing support member 35 is preferably bored axially to form a surrounding skirt 36.

The pintle and ring jewel bearings at the respective upper and lower ends of the spindle 10 permit axial displacement movement of the spindle with respect to the fixed bearing parts while at the same time inhibit any lateral displacement of either end of the spindle. In consequence, the whole of the rotational parts are free to float with the weight thereof supported by the repulsion magnetic field set up between the opposing surfaces 18 and 30 of the magnets 12 and 24 while allowing free rotation of such rotational parts without any drag imposed by the magnet supporting arrangements.

The free length of the pintle 28 between the upper end of the body 29 and the region of its contact with the ring jewel 23 is somewhat critical for optimum results where the natural resilience of the pintle enables the vibration which exists in the rotor disc to be absorbed. Excessive free length of the pintle may result in violent oscillation of the disc whereas insufficient length may cause the ring jewel to rattle on the pintle and result in excessive wear.

The magnets 12 and 24 are preferably of the ceramic type made from powdered oxides but other forms of permanent magnet may be used. During operation, the air gap between the parallel end faces 18 and 30 of the magnets is conveniently of the order of 0.06 to 0.08 inch.

FIGS. 2 and 3 illustrate another embodiment of the invention in which means are provided for controlling the amount of vertical displacement movement of the rotor spindle within its supporting bearings. To this end, the recess 19 at the lower end of the spindle 10 and also, although not shown, the recess at the upper end of the spindle, is provided with a hardened steel ball 37 which is made an interference fit in the related recess and is forced into position whereby it lies in contact with the inner end of such recess. By then adjusting the position of the facing end of the pintle 28 with respect to the surface of such ball, accurate control over the total displacement of the spindle 10 may readily be obtained. Such control over vertical displacement prevents the rotor disc being damaged in the event of accidental shock but, of course, under normal operating conditions the whole of the weight of the spindle, rotor disc 11 and magnet 12 is taken by the magnetic suspension system which operates in a similar manner to that already described in connection with FIG. 1.

In order to effect accurate control of the position of the upper end of the pintle 28 while still allowing the necessary adjustment of the spacing between the opposing surfaces 18, 30 of the two magnets 12 and 24, the lower magnet 24 is in this instance carried by a separate cup shaped body 38, preferably formed of moulded nylon, which is provided with an upstanding peripheral flange 39 surrounding and gripping the outer surface of the lower magnet 24 in similar manner to the first embodiment of FIG. 1. This body 38 is provided with an axial bore internally screw-threaded as shown at 40 to engage with a complementary screw thread 41 formed at the upper end of the metal support sleeve 42 which otherwise resembles the sleeve 26 of FIG. 1. The screw-threaded bore 40 of the body 38 terminates in a restricted diameter plain cylindrical section 43 which is dimensioned to be an interference fit upon an unthreaded cylindrical extension 44 of the upper end of the sleeve 42. This construction provides a locking means for retaining the body 38 in any adjusted position upon the sleeve 42, and, at the same time ensures accurate concentricity of the body 38 and the magnet 24 carried thereby with relation to the axis of rotation of the rotor spindle and the pintle 28 carried by the fixed sleeve 42.

To facilitate adjustment of the body 38 and the magnet 24 carried thereby, such body may be provided with projecting ribs as indicated at 45.

This embodiment also includes means for compensating for the effects of temperature changes upon the operative suspension flux between the two magnets 12, 24. It has been found that the height of the rotor disc 11 under suspension and hence its position within the operative magnetic flux gap of the associated metering mechanism is subject to variation with change of ambient temperature. The temperature compensating means comprise the provision of a body of temperature sensitive magnetic alloy, i.e. one having a very low Curie point, in the vicinity of the flux path between the two magnets 12, 24. As shown this body is in the form of an incomplete or C-shaped rectangular section ring 46 adapted to be clipped around the outer peripheral surface of the upper half of the lower magnet 24 whereby its upper end surface lies flush or substantially flush with the surface 30 of such magnet. To ensure accurate positioning of this added ring, the height of the flange 39 of the cup-shaped body 38 is suitably adjusted so that the ring can rest upon the upper edge of such flange. The material employed for the ring 46 is conveniently that known under the name "Mu-temp."

FIG. 4 shows a further embodiment in which the lower magnet 24 is embedded in the cup-shaped upper end 25 of a support member 47 having a dependent stem 48. This member 47 is preferably formed of die cast metal. In the formation of this member steps similar to those employed in connection with the mounting of the rotor disc 11 and the upper magnet 12 upon the rotor spindle 10 are adopted by arranging for an inner extension 49 to extend up through the bore of the tubular lower magnet 24 and to form a flange 50 overlying the inner region of the upper surface 30 of such magnet.

The lower end of the stem 48 is shown held in position between a part 53 of the main frame of the meter and a clamping block 54 which is secured to the part 53. The part 53 is provided with a V-section groove 55 while the block 54, conveniently of die-cast metal, is formed with a half-cylindrical channel 56 engaging the plain portion of the stem 48 and a half-cylindrical screw-threaded region 57 which engages with a threaded region 58 at the lower end of the stem 48. The block 54 is held in position by a spring clip 59.

The temperature compensating member 46 in this embodiment is either a complete or an incomplete ring disposed around the upper region of the lower magnet 24, such ring being also embedded in the cup-shape end 25 of the member 47 by extension upwardly of the outer surrounding wall as shown. In this embodiment a plurality of holes lying parallel to the axis of the structure are provided as shown at 51. These holes serve initially for accurate positioning of the lower magnet 24 during the initial die casting operation and subsequently provide means for the insertion of a tool to effect rotation of the member 47 about the screw thread 57 of the lower stationary member and thereby to effect alteration of the position of the upper surface 30 of the magnet 24 with respect to the lower surface 18 of the upper magnet 12.

In this embodiment also, a disc-shaped pad 52 of nylon is carried within the recess 19 for the purpose of limiting the vertical displacement of the rotor spindle 10 instead of the steel ball shown in FIG. 2. A similar construction is provided at the upper end of the spindle and by adjustment of the effective height of the pintle 28 limitation of the amount of vertical displacement may be provided.

A further embodiment combining the die-cast mounting arrangement for the lower magnet 24 and the temperature compensating member 46 shown in FIG. 4 with the facility for separate adjustment of position of the lower magnet as shown in FIG. 2, is illustrated in FIG. 5. In this embodiment the lower magnet 24 with the temperature compensating member 46 is moulded within a cup-shaped body 38, preferably of nylon, carried upon a screw-threaded region 41 of a separate die-cast metal support stem 62 forming the equivalent of the sleeve 42 of FIG. 2. Such stem 62 has the pintle 28 fixed directly therein.

In this embodiment the use of the additional holes 14 in the rotor disc 11 and the securing ring 15 beneath the rotor disc is avoided, the securing of the parts 10, 11 and 12 being effected solely by the central tubular extension 16 of the die-cast body 13 passing downwardly through the bore of the magnet 12 and terminating in the lower end flange 17.

Although the upper and lower end bearings provided for the rotor spindle have been shown as of the pintle and ring jewel type, it will be clear that any other suitable known form providing the required freedom for axial displacement but without allowing appreciable lateral displacement may be employed.

It will also be clear that the described embodiments represent only particular ways of carrying out the invention and that various modifications may be made, for instance, in a manner of securing and mounting each of the opposing cylindrical magnets and/or the temperature compensating member. For example, the latter could be secured to or around the upper magnet but with the obvious disadvantage of adding to the weight to be suspended by the magnetic system. Instead of employing die-cast metal for the body 13 and the support members 26, 42 or 62, molled plastic material, such as nylon, may be used instead.

I claim:
1. In an electric meter comprising a stationary main frame and a moving system including a rotor disk and a mounting spindle rotatably supporting said disk on a substantially vertical axis in said main frame, the combination therewith of a magnetic suspension system for said moving system comprising upper rotating and lower stationary permanent magnets both of cylindrical tubular form disposed in axial alignment concentrically of said spindle axis with an air gap defined between the adjacent ends of said magnets, said permanent magnets being magnetized longitudinally with like magnetic poles of the two magnets confronting each other across said air gap to exert a repulsion force therebetween, means mounting said upper rotating permanent magnet on said spindle to rotate therewith, a mounting fixture for adjustably mounting said lower stationary permanent magnet on said main frame, said mounting fixture comprising a lower standard and an upwardly facing cup-shaped socket at the upper end of said standard, means mounting said standard for vertical height adjustment in said main frame of the meter, a relatively deep main bore formed in said socket, said lower stationary permanent magnet being seated in said main bore, a relatively shallow counterbore formed at the upper end of said main bore, and a temperature compensating magnetic ring fixedly seated in said counterbore in position to surround the upper portion of said lower permanent magnet, said compensating ring being composed of a temperature compensating magnetic alloy having a very low Curie point, and operating to shunt flux lines approximately at the upper pole face of said lower permanent magnet pursuant to changes in the ambient temperatures acting on the meter.

2. The combination defined in claim 1 wherein there is provided further bearing means at or adjacent the respective upper and lower ends of said spindle, said further bearing means being each of a type which permits axial shifting displacement but inhibits lateral displacement movement of the spindle with respect thereto.

3. The combination defined in claim 1 wherein the upper face of said temperature compensating ring lies approximately flush with the upper pole face of said lower permanent magnet.

4. The combination defined in claim 1 wherein there are provided a plurality of substantially parallel holes extending downwardly from the bottom of said main bore to the underside of said cup-shaped socket to facilitate the aforesaid vertical height adjustment of said mounting fixture in the meter frame in the relative positioning of the parts.

5. In an electric meter comprising a stationary main frame and a moving system including a rotor disk and a mounting spindle rotatably supporting said disk on a substantially vertical axis in said main frame, the combination therewith of a magnetic suspension system for said moving system comprising upper rotating and lower stationary permanent magnets both of cylindrical tubular form disposed in axial alignment concentrically of said spindle axis with an air gap defined between the adjacent ends of said magnets, said permanent magnets being magnetized longitudinally with like magnetic poles of the two magnets confronting each other across said air gap to exert a repulsion force between the adjacent pole faces of the two magnets, said upper permanent magnet being fixedly secured to said spindle to rotate therewith, a mounting fixture for adjustably mounting said lower stationary permanent magnet on said stationary main frame of the meter, said mounting fixture comprising an upwardly facing cup-shaped socket, said lower stationary permanent magnet being seated in said cup-shaped socket, and a temperature compensating magnetic ring fixedly secured to said mounting fixture in position to surround the upper portion of said lower permanent magnet, said compensating ring being composed of a temperature compensating magnetic alloy operating to influence the path of magnetic flux lines at the upper pole face of said lower permanent magnet pursuant to changes in the ambient temperature acting on the meter.

6. A magnetic suspension bearing for a vertical spindle, such as the spindle of an electric watt-hour meter, comprising a first cylindrical and tubular permanent magnet secured to said spindle in co-axial relationship to said spindle with its lower annular end surface disposed in a plane normal to the axis of spindle rotation, a second cylindrical and tubular permanent magnet secured below said first permanent magnet in a fixed position co-axial with said axis of spindle rotation and with its upper annular end surface parallel with but spaced from said lower end surface of said first magnet, said magnets each being magnetized with an axial polarization direction and having the faces thereof which oppose one another of like polarity so as to exert a repulsion force between said two magnets, further bearing means at or adjacent the respective upper and lower ends of said spindle, said further bearing means being each of a type which permits axial displacement movement but inhibits lateral displacement movement of the spindle with respect thereto, and a temperature compensating magnetic ring mounted in fixed relation to surround the upper portion of said second fixed permanent magnet, said temperature compensating ring being composed of a temperature compensating magnetic alloy having a relatively low Curie point and also having approximately the magnetic-thermal characteristics of "Mu-Temp" alloy, whereby said ring acts as a temperature compensating magnetic shunt with respect to the magnetic flux lines creating the repulsion force between said two magnets.

7. In apparatus of the class described for magnetically suspending a substantially vertical rotary spindle, the combination of a rotatable permanent magnet connecting to said spindle to rotate therewith, a stationary permanent magnet mounted in stationary relationship to said rotatable permanent magnet, said two permanent magnets being so polarized and so disposed relatively to each other as to have their magnetic fluxes interact to suspend at least part of the weight of said spindle during its rotary movement, and temperature compensating means associated with said permanent magnets composed of a temperature sensitive magnetic alloy operative to maintain substantially constant the suspension characteristics of said magnetic fluxes despite changes in the ambient temperatures in which the apparatus is operating.

References Cited in the file of this patent

UNITED STATES PATENTS

| | | |
|---|---|---|
| 1,431,545 | Schwartz | Oct. 10, 1922 |
| 2,254,698 | Hansen | Sept. 2, 1941 |
| 2,333,647 | Green | Nov. 9, 1943 |
| 2,391,313 | Hindle | Dec. 18, 1945 |